United States Patent
Hoyt et al.

(10) Patent No.: US 10,955,375 B2
(45) Date of Patent: Mar. 23, 2021

(54) MULTIELECTRODE SENSOR FOR CONCENTRATION AND DEPTH MEASUREMENTS IN MOLTEN SALT

(71) Applicant: Energy, United States Department of, Washington, DC (US)

(72) Inventors: Nathaniel C. Hoyt, Westmont, IL (US); Mark A. Williamson, Naperville, IL (US); James L. Willit, Batavia, IL (US)

(73) Assignee: U.S. Department of Energy, Washington, DC (US)

( * ) Notice: Subject to any disclaimer, the term of this patent is extended or adjusted under 35 U.S.C. 154(b) by 186 days.

(21) Appl. No.: 15/923,155

(22) Filed: Mar. 16, 2018

(65) Prior Publication Data

US 2019/0285565 A1 Sep. 19, 2019

(51) Int. Cl.
  *G01N 27/28* (2006.01)
  *G01N 27/48* (2006.01)
  *G01N 27/416* (2006.01)

(52) U.S. Cl.
  CPC ....... *G01N 27/283* (2013.01); *G01N 27/4166* (2013.01); *G01N 27/48* (2013.01)

(58) Field of Classification Search
  CPC .. G01N 27/283; G01N 27/4166; G01N 27/48; G01N 27/301; G01N 27/28–286; G01N 17/02; G01N 17/04; G01N 17/006–046; G01N 27/49
  See application file for complete search history.

(56) References Cited

U.S. PATENT DOCUMENTS

| | | | | |
|---|---|---|---|---|
| 3,406,101 A | * | 10/1968 | Kilpatrick | G01N 17/02 205/777 |
| 5,015,355 A | * | 5/1991 | Schiessl | G01N 17/02 204/404 |
| 5,084,156 A | * | 1/1992 | Iwanaga | C25B 9/06 204/247 |
| 5,632,881 A | * | 5/1997 | Gabelich | G01N 27/4114 204/400 |
| 6,540,902 B1 | * | 4/2003 | Redey | C25C 3/00 205/354 |

(Continued)

FOREIGN PATENT DOCUMENTS

WO   WO-2011048378 A2 * 4/2011 ........... G01N 33/383

OTHER PUBLICATIONS

Snook et al., Development of a niobium-doped titania inert anode for titanium electrowinning in molten chloride salts, Faraday Discussions, vol. 190, pp. 35-52 (2016) (Year: 2016).*

(Continued)

*Primary Examiner* — Maris R Kessel
*Assistant Examiner* — Vivian A Tran
(74) *Attorney, Agent, or Firm* — Karen L. Blouin; Michael J. Dobbs; Brian J. Lally

(57) ABSTRACT

A multi electrode sensor that provides in-situ, real time measurements for molten salts and other process fluids such as real-time concentration and salt level measurements for nuclear systems such as molten salt reactors, nuclear reprocessing facilities utilizing molten salts and concentrated solar power systems. The sensor has multiple electrodes with unique lengths which are connected to a potentiostat. Measurements are taken when the electrodes are immersed in the process fluid.

9 Claims, 7 Drawing Sheets

(56) References Cited

U.S. PATENT DOCUMENTS

| | | | | |
|---|---|---|---|---|
| 7,508,223 | B1* | 3/2009 | Yang | G01N 17/02 324/700 |
| 7,632,384 | B1* | 12/2009 | Redey | G01N 27/416 204/408 |
| 2002/0153907 | A1* | 10/2002 | Yang | G01N 17/02 324/700 |
| 2003/0169058 | A1* | 9/2003 | Pierre | C23F 13/04 324/700 |
| 2004/0155670 | A1* | 8/2004 | Yang | G01N 17/02 324/700 |
| 2006/0249382 | A1* | 11/2006 | Hengstenberg | G01N 27/404 204/412 |
| 2008/0190777 | A1* | 8/2008 | Fray | C25C 5/04 205/401 |
| 2008/0217172 | A1* | 9/2008 | Chiang | G01N 17/04 204/404 |
| 2011/0251721 | A1* | 10/2011 | Hefner | G01N 17/02 700/275 |
| 2014/0083866 | A1* | 3/2014 | Daniels | G01N 27/3277 205/780.5 |
| 2018/0080899 | A1* | 3/2018 | Simpson | G01N 27/36 |
| 2019/0237209 | A1* | 8/2019 | Tripathy | C25C 3/36 |
| 2019/0240985 | A1* | 8/2019 | Ge | G01F 23/243 |

OTHER PUBLICATIONS

Matsumiya et al., Recovery of EU2+ and Sr2+ Using Liquid Metallic Cathodes in Molten NaCl—KCl and KCl System, Journal of Nuclear Science and Technology, vol. 34, No. 3, pp. 310-317 (1997) (Year: 1997).*

Snook et al., Synchrotron X-ray Diffraction Monitoring of the Operation of an Inert Anode Utilised in a Cambridge FFC-Cell, ECS Transactions, vol. 50, pp. 45-56 (2012) (Year: 2012).*

Snook et al., Current pulse measurement of capacitance during molten salt electrochemical experiments, J. Solid State Electrochem., vol. 13, pp. 591-598 (2009) (Year: 2009).*

Carotti et al., Characterization of a Thermodynamic Reference Electrode for Molten LiF—BeF2 (FLiBe), Journal of The Electrochemical Society, vol. 164, Issue 12, p. H854-H861 (2017) (Year: 2017).*

Kontoyannis, Pyrolytic Boron Nitride Coated Graphite as a Container of Reference Electrodes for Molten Fluorides, Electrochimica Acta, vol. 40, No. 15, pp. 2547-2551 (1995) (Year: 1995).*

Carotti et al., An Electrochemical Study of Hydrogen in Molten 2LiF—BeF2 (FLiBe) with Addition of LiH, Electrochimica Acta, In Press, Journal Pre-proof (2020) (Year: 2020).*

Afonichkin et al., Dynamic reference electrode for investigation of fluoride melts containing beryllium difluoride, Journal of Fluorine Chemistry, vol. 130, pp. 83-88 (2009) (Year: 2009).*

Wang et al., Galvanic corrosion of pure metals in molten fluorides, Journal of Fluorine Chemistry, vol. 165, pp. 1-6 (2014) (Year: 2014).*

Inzelt et al., Handbook of Reference Electrodes, Springer (2013) (Year: 2013).*

Richardson et al., Corrosion by Molten Fluorides, Oak Ridge National Laboratory (1953) (Year: 1953).*

Jenkins, Electrochemical Measurements in Molten Fluorides, PhD diss., University of Tennessee (1969) (Year: 1969).*

Keiser et al., The Corrosion Resistance of Type 316 Stainless Steel to Li2BeF4, Oak Ridge National Laboratory (1977) (Year: 1977).*

* cited by examiner

_US 10,955,375 B2_

MULTIELECTRODE SENSOR FOR CONCENTRATION AND DEPTH MEASUREMENTS IN MOLTEN SALT

GOVERNMENT INTERESTS

The United States Government has rights in this invention pursuant to Contract No. DE-AC02-06CH11357 between the U.S. Department of Energy (DOE) and UChicago Argonne, LLC.

FIELD OF THE INVENTION

The present invention relates to in-situ real-time concentration and salt level measurements for molten salt systems.

BACKGROUND OF THE INVENTION

As the high radiation environment and high temperatures of molten salt nuclear systems make many common process monitoring techniques untenable, electroanalytical approaches have received considerable attention for this application. Electroanalytical techniques are based on measurements of the amount of current that flows through an electrode immersed in the molten salt when a specific potential waveform has been applied to that electrode. Electroanalytical methods have been used in the past for analysis of molten salt systems, but these approaches have a number of shortcomings.

One of the largest issues is the determination of the surface area of the electrodes in the molten salt; the area is required to be known in order to calculate concentrations because the current response is proportional to both the concentration and the available electrode area. Hence, without accurate determination of the electrode area, it is impossible to know whether or not a current response is large because of a correspondingly large reactant concentration or because there's simply a large surface area available for the electrochemical reaction to occur.

Various attempts have been made to provide the necessary information about the area. Some approaches immerse electrodes in the salt and then subsequently remove them and determine the area based on the amount of salt film that remains attached to the electrode surface. This technique is slow and requires repeated removal of the electrode to make measurements of the film. Other techniques, such as glass encased electrodes and microelectrodes, create a fixed electrode area through the use of non-conductive coatings to delimit a prescribed exposed surface. These barrier coatings, however, are limited to narrow potential ranges and generally are only stable for very limited times in corrosive molten salt environments which often results in either a loss of the non-conductive coating or in the formation of a conductive layer on the surface of the non-conductive coating.

Therefore, there is an urgent need for a sensor that provides in-situ real-time concentration and salt level measurements.

SUMMARY OF THE INVENTION

According to one aspect of the invention a multielectrode sensor is provided for concentration and depth measurements in process fluids. The sensor has an array that includes a plug and multiple electrodes. The plug has a top surface and a bottom surface with multiple openings extending from the top surface to the bottom surface. Each of the openings are spaced equidistant from adjacent openings. Each of the electrodes has a bottom end and a predetermined length. Each electrode has a known, different length from the other electrodes. The electrodes are inserted into the openings in the plug so that all of the bottom ends contact the process fluid with different immersion depths. One of the electrodes may be a counter electrode. A potentiostat is in electrical communication with each of the electrodes and can apply voltage waveforms to the electrodes and measure current. By using the current versus voltage measurement, the depth and concentrations of the process fluid can be determined.

A principal advantage of the sensor of the invention is the speed by which measurements may be taken. Furthermore time is saved because cleaning and relaxation and resting of selected electrodes can occur while testing is occurring on other electrodes. The frequency of concentration measurements can be reduced by more than 60% while still achieving accurate results with low statistical uncertainty.

BRIEF DESCRIPTION OF THE DRAWINGS

These and further aspects of the invention and their advantages can be discerned in the following detailed description, in which like characters denote like parts and in which.

DETAILED DESCRIPTION OF THE INVENTION

The multi electrode sensor 100 provides in-situ, real time measurements for molten salts and other process fluids. For example, the sensor can provide real-time concentration and salt level measurements for nuclear systems such as molten salt reactors, nuclear reprocessing facilities utilizing molten salts and concentrated solar power systems. Concentration and salt level measurements are crucial for process monitoring to ensure proper chemistry and product quality and for nuclear material safeguards (i.e., material accountancy of salts containing nuclear materials).

Figure 1:
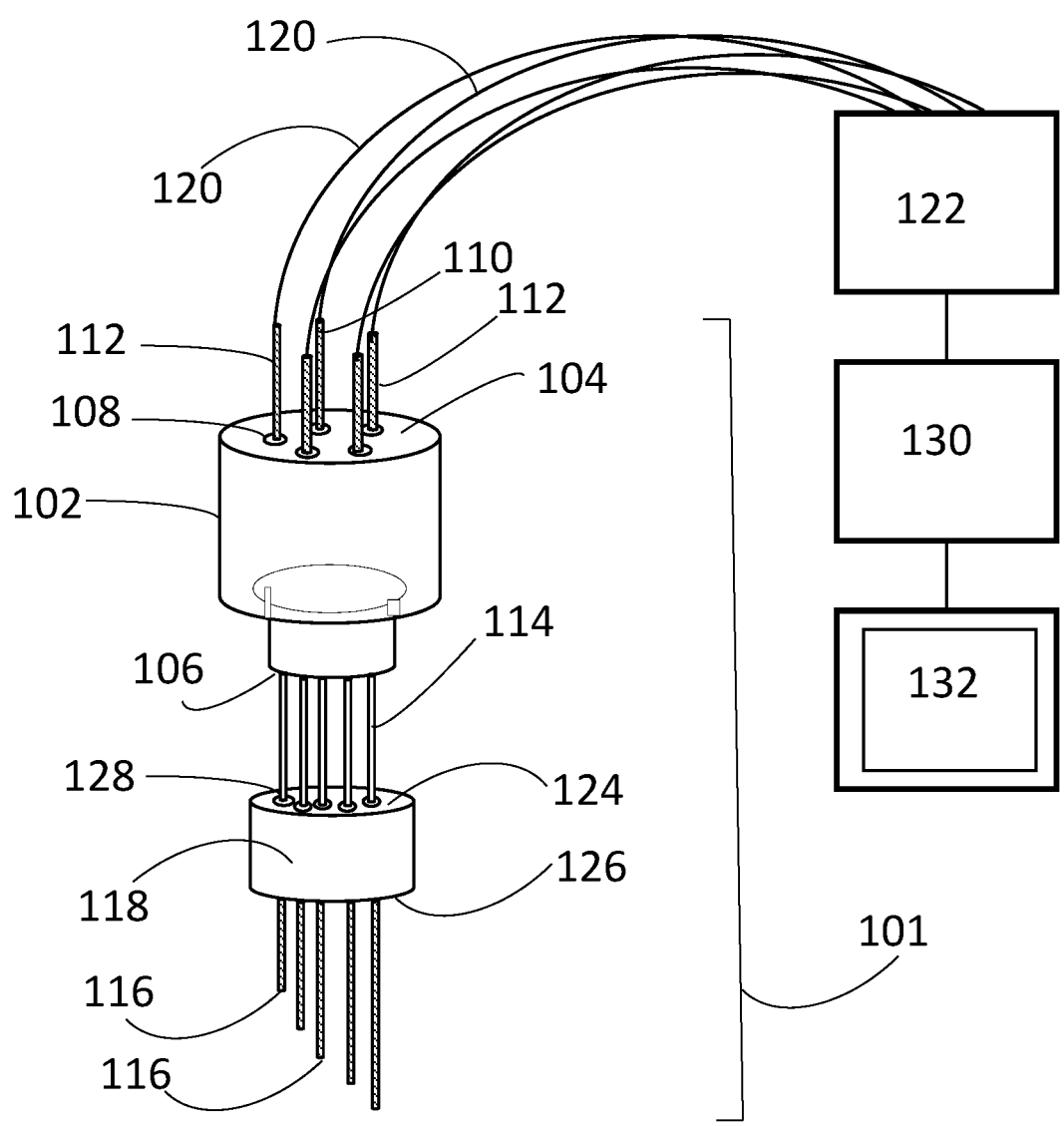
FIG. 1 is a perspective view of the a multielectrode sensor according to the invention.

As illustrated in FIG. 1, the sensor has an array 101. The array includes a plug 102. The plug has a top surface 104 and a bottom surface 106. Several openings 108 extend from the top surface 104 to the bottom surface 106. Each of the openings 108 is spaced equidistant from adjacent openings 108. The plug 102 is formed of a nonconductive material. In one embodiment the plug 102 is ceramic.

The array 101 further includes many electrodes 110, 112. One of the electrodes may be a counter electrode 110. Each of the electrodes has a predetermined length that is different than the predetermined length of any of the other electrodes 110, 112. In other words, none of the electrodes 110, 112 have identical lengths. Each of the electrodes have a bottom end 116. Each of the electrodes 110, 112 is removeably inserted into an opening 108 of the plug 102. In the embodiment illustrated in FIG. 1, the electrodes are shown being parallel to each other. Alternate embodiments may have electrodes that are no parallel to each other such that acceptable results are obtained.

In the embodiment illustrated in FIG. 1 there is one counter electrode 110 and four bimodal electrodes 112. If a specific counter electrode is not included among the sensor's array of electrodes 112, then an alternate electrode immersed in the same molten salt bath (e.g. the anode or cathode of the process equipment) can be used as a current sink for the working electrodes 112. The bimodal electrodes 112 are used either as working electrodes or quasireference electrodes at different points during the measurement sequence. Alternate embodiments may have fewer or more bimodal electrodes 112. The number of bimodal electrodes 112 will be application specific. In the embodiment illustrated in FIG. 1, the plug 102 is circular and the bimodal electrodes 112 and counter electrode 110 are arranged in a circular fashion with counter electrode 110 in the center and constant spacing between adjacent electrodes 110, 112. Alternate embodiments may have plugs 102 of different shapes and/or electrodes 110, 112 arranged in other than a circular arrangement with constant spacing between adjacent electrodes 110, 112. In yet further embodiments, a dynamic reference electrode (i.e. a cathode at which the interface between a deposited metal and the salt may be used to facilitate potential measurements) or a thermodynamic reference (e.g., an electrode containing a fixed salt composition with appropriate electrochemical couple separated from the analyte by an ion-conducting separator) may be substituted for one of the bimodal electrodes 112 in the array if additional potentiometric capabilities are desired.

In the illustrated embodiment, ceramic straightening tubes 114 encapsulate the electrodes 110, 112 to aid in maintaining the proper alignment and provide electrical isolation between the electrodes above the fluid level. In addition, a second plug 118 is included to aid in insertion of the array 101 into the ports of the vessel such as a molten salt vessel. The second plug has a top surface 124, a bottom surface 126, and a pattern of holes 128 that aligns the straightening tubes. Alternate embodiments may not have a second plug 118. Ceramic adhesives may be used to hold the array 101 together.

The electrodes 110, 112 are in electrical communication with a switch/multichannel potentiostat 122. The potentiostat 122 must be capable of multichannel operation or be capable of use with a signal multiplexer. In the illustrated embodiment the electrodes 110, 112 and potentiostat 122 are connected by wires 120. The wires 120 may be connected to the electrodes 110, 112 by alligator clips, crimp connectors or any other standard electrical connector that produces acceptable results. In alternate embodiments the potentiostat 122 may be electrically connected to a controller 130 and display 132. The controller 130 cycles the potentiostat 122 and the results of the potentiostat's 122 measurements are graphically or numerically depicted on the display 132.

Figure 2:
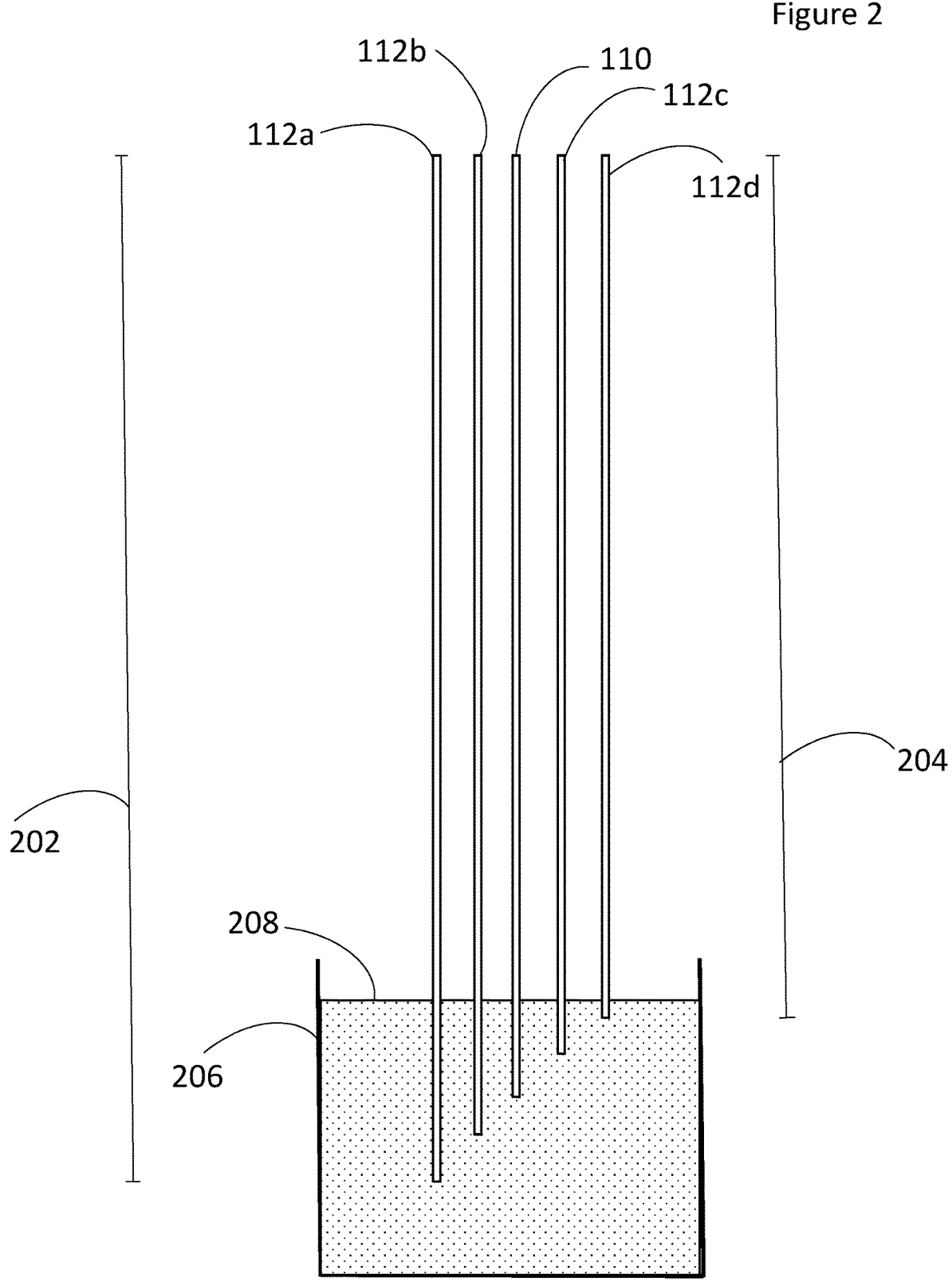
FIG. 2 is a view of the electrodes in a vessel of process fluids.

As illustrated in FIG. 2, the counter electrode 110 and the bimodal electrodes 112a-d each have a predetermined length 202, 204. None of the electrodes 110, 112a-d have identical lengths as compared to other electrodes 100, 112a-d. Therefore when the bottom portion of the electrodes are immersed in the electrolyte, each of the bimodal electrodes 112a-d has a predetermined immersed surface area. In the embodiment illustrated in FIG. 2 each of the bimodal electrodes 112a-d have identical diameters, accordingly each of the bimodal electrodes 112a-d has a unique surface area due to the differences in lengths 202, 204. In alternate embodiments the electrodes 110, 112a-d may have non-identical diameters or a combination of non-identical diameter and unique lengths.

When inserted into a vessel, 206, the electrodes 110, 112a-d reach various depths as measured from the top level of the process fluid or molten salt 208. The differing prescribed lengths 202, 204 of the individual electrodes 110, 112a-d in the array 101 allow for the determination of current density in terms of amperes per unit depth. By taking electroanalytical measurements on each electrode 110, 112a-d in the array 101 in a carefully designed sequence, the current per unit depth can be determined.

Figure 3:
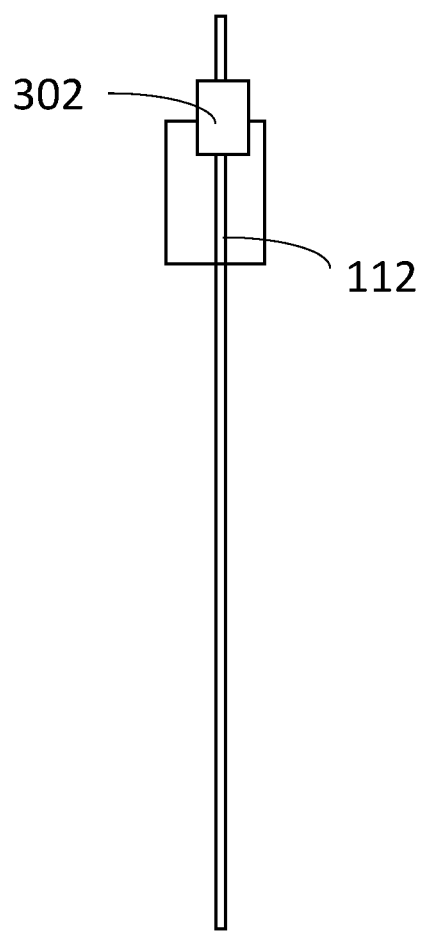
FIG. 3 is a plan view of a single electrode according to the invention.

A single bimodal electrode 112 is illustrated in FIG. 3. In the embodiment illustrated, a cylindrical mating collar 302 is used to precisely maintain the position of the electrode 112 in the plug 102. Alternate embodiments may use alternate means of maintaining the position of the electrode 112 in the plug 102 such that acceptable results are obtained.

Each of the electrodes 110, 112 are formed from an inert, conductive material. In one embodiment each of the electrodes 110, 112 is formed from a metal. In one embodiment each of the electrodes 110, 112 is formed from tungsten. The bimodal and counter electrodes 110, 112 may be formed from any material that is able to withstand the temperatures of the fluid in which they will be inserted and produce acceptable results.

In operation, the electrodes 110, 112 are installed in the process fluids. Process fluids may include molten salts, aqueous solutions, nonaqueous solutions, or ionic liquids. During the measurement sequence, one of the bimodal electrodes 112 is selected to be the working electrode and an adjacent bimodal electrode 112 is chosen to be the quasi-reference electrode. The working electrode is connected to the potentiostat's 122 working and working-sense connectors either manually or using a multiplexer. Similarly, the quasi-reference electrode is connected to the potentiostat's 122 reference-sense lead either manually or using a multiplexer. The electrode in the center of the sensor 100 may serve as the counter electrode 110 for all measurements and would always be connected to the potentiostat's 122 counter-electrode lead when operating in that capacity. Electroanalytical waveforms (typically cyclic voltammagrams or similar voltammetry techniques) are then applied to the working electrode, and the response is measured. With the electroanalytical measurement completed, appropriate disconnections and reconnections are made (either manually, using a multiplexer, or using the capabilities of a multichannel potentiostat) and the next bimodal electrode pair in the array 101 are chosen to be the new working electrode and quasi-reference electrode. The sequence of measurements followed by reconnections to new pairs of bimodal electrodes is continued until electroanalytical results have been taken across the entire array 101 at every available immersion depth.

Figure 4:
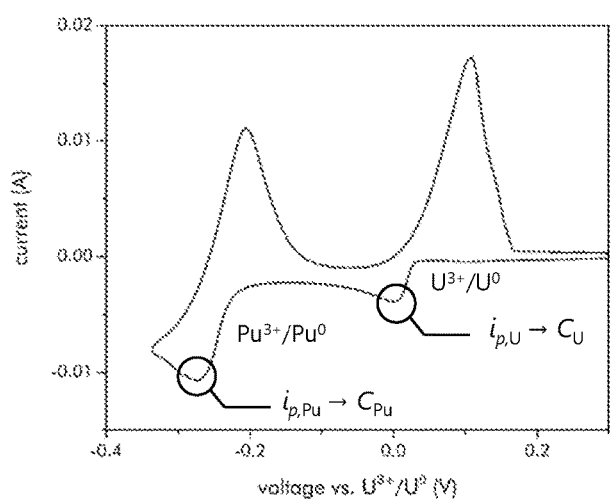
FIG. 4 is a plot of current versus voltage for one electrode.

FIG. 4 illustrates a graph that plots current versus voltage for one electrode. The concentration is proportional to the peak current divided by the area of the electrode or $C \propto i_p/A$.

Figure 5:
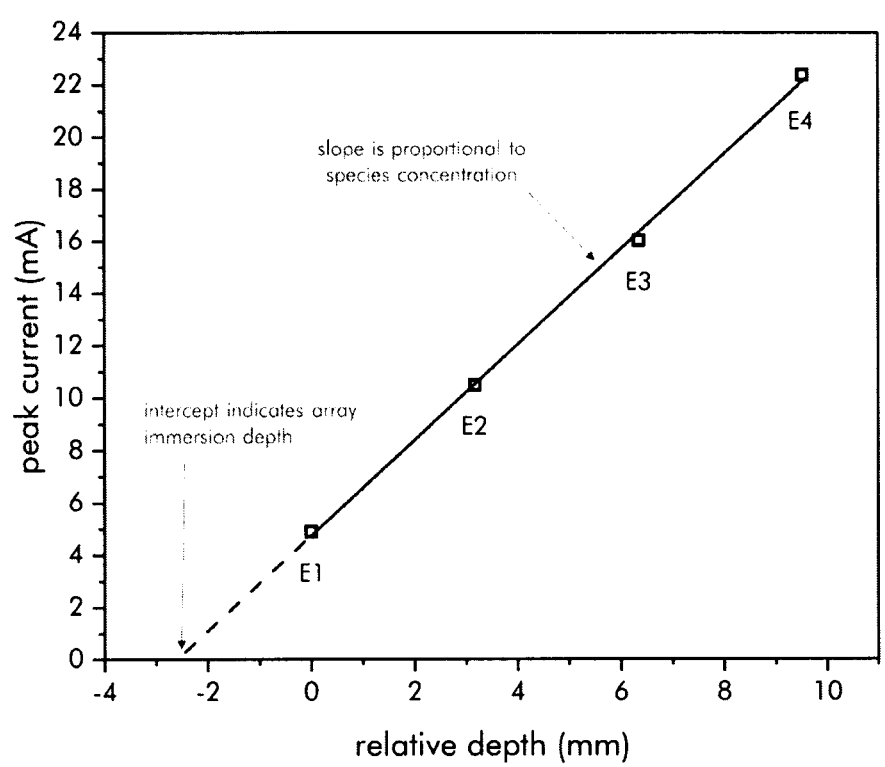
FIG. 5 is a plot of peak current versus relative electrode depth.

As illustrated in FIG. 5, for an array 101 in molten salt, the response (peak current) is plotted as a function of the relative electrode depth for four electrodes in molten salt containing 1 wt % $U^{3+}$. Information on the species concentration and depth can be ascertained. The slope of the resulting curve gives the current per unit length which is used to calculate the concentrations of salt. The x-intercept indicates the immersion depth of the electrode array which can be used to determine the total salt depth.

Figure 6:
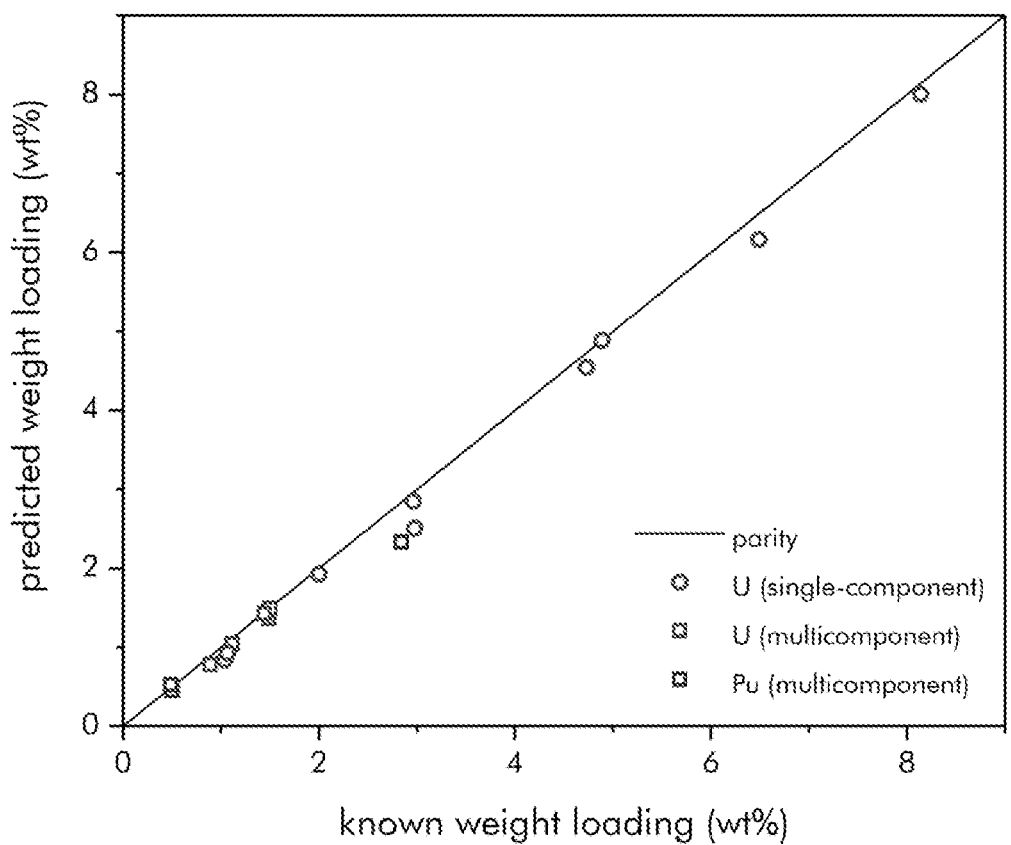
FIG. 6 is a parity plot comparing predicted and known concentrations in a wide variety of single-component and multi-component salts; and, FIG. 7 is a plot of salt depth versus amount of LCl—KCl eutectic salt added to a baseline multicomponent salt.

Testing was conducted using a machined Macor/alumina multielectrode array sensor. The sensor had one counter electrode and six bimodal electrodes. It was used for molten salt testing. FIG. 6 illustrates a parity plot comparing predicted and known concentrations in a wide variety of single-component and multi-component salts. This plot demonstrates the accuracy of the multielectrode sensor 100.

Figure 7:
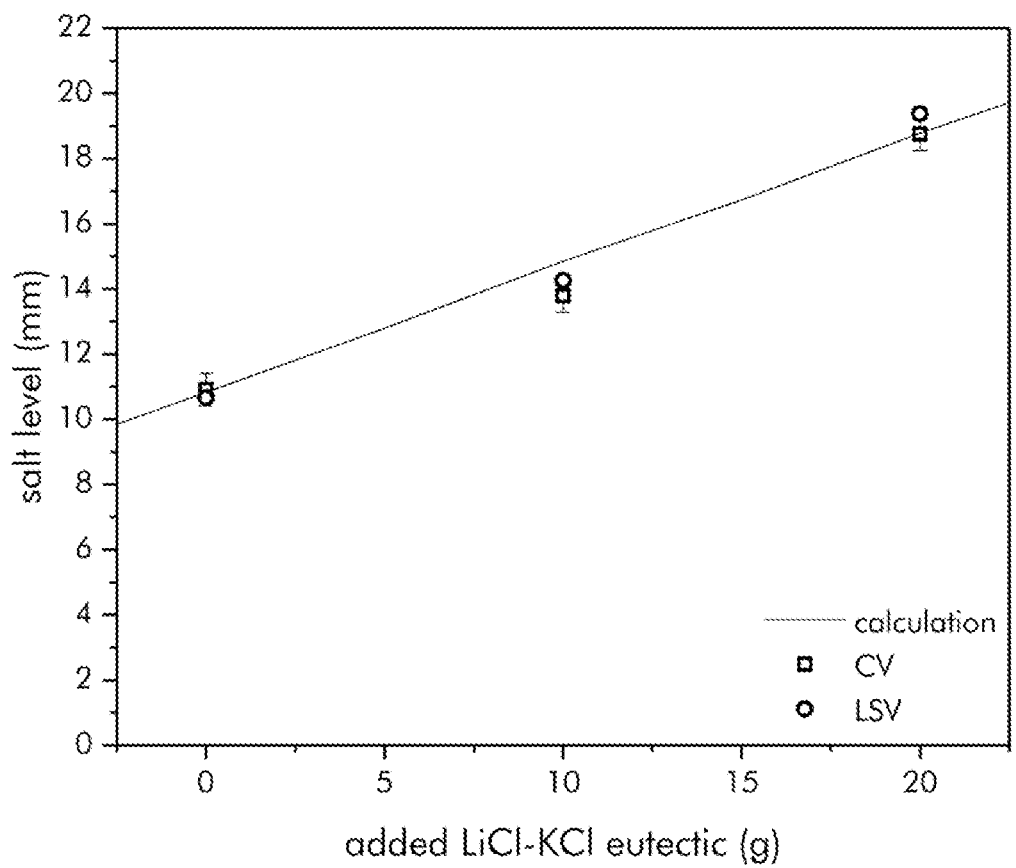

FIG. 7 plots salt level (mm) versus amount of LiCl—KCl eutectic (g) added to a baseline multicomponent salt. As the salt mass is increased, the measurement of salt level tracks accurately.

Advantages of the multielectrode sensor 100 over prior art measurement devices are that it covers a wider potential range (allowing for measurements of both highly electronegative and electropositive species), has faster measurement rates, has no moving parts, has increased electrode longevity, can simultaneously provide salt level measurements, and is tolerant of thermal cycling.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

All publications and patent documents cited in this application are incorporated by reference in their entirety for all purposes to the same extent as if each individual publication or patent document were so individually denoted.

Any element in a claim that does not explicitly state "means for" performing a specified function, or "step for" performing a specific function, is not to be interpreted as a "means" or "step" clause as specified in 35 U.S.C. § 112, ¶6. In particular, the use of "step of" in the claims herein is not intended to invoke the provisions of 35 U.S.C. § 112, ¶6.

The invention claimed is:

1. A multielectrode sensor providing a current per unit depth measurement in a vessel of process fluids, the multielectrode sensor comprising:

an array, the array having a first plug and a plurality of electrodes, the first plug having a top surface and a bottom surface, a plurality of openings extending from the top surface to the bottom surface wherein each of the plurality of openings is spaced equidistant from adjacent openings, each of the plurality of electrodes formed of an inert material;

each of the plurality of electrodes having a bottom end, and a respective predetermined length wherein each respective predetermined length is different, each of the plurality of electrodes removably inserted into one of the plurality of openings such that each of the plurality of bottom ends contact the process fluids at a respective immersion depth wherein each respective immersion depth is different, at least one of the plurality of electrodes being a counter electrode and the remainder of the plurality of electrodes operable as both working electrodes and quasi-reference electrodes;

a plurality of bimodal electrode pairs formed from two adjacent ones of the plurality of electrodes wherein one electrode functions as a working electrode and one electrode functions as a quasi-reference electrode;

a potentiostat in electrical communication with each of the plurality of electrodes, the potentiostat adapted to apply an electroanalytical waveform to each of the plurality of bimodal electrode pairs in a measurement sequence to obtain a current per unit depth of the process fluids at each of the immersion depths.

2. The multielectrode sensor of claim 1, and further including a controller and a display, the controller and display in electrical communication with the potentiostat.

3. The multielectrode sensor of claim 1, wherein the first plug is made of non-conductive material.

4. The multielectrode sensor of claim 1, wherein the first plug is made of ceramic.

5. The multielectrode sensor of claim 1, further comprising a second plug in the array, wherein the second plug is spaced from the first plug, the second plug having a top surface and a bottom surface, a plurality of openings extending from the top surface to the bottom surface of the second plug wherein each of the plurality of openings of the second plug is spaced equidistant from adjacent openings and aligned with corresponding openings in the first plug, such that each of the plurality of electrodes may be inserted into one of the plurality of openings in each of the first and second plug.

6. The multielectrode sensor of claim 1, wherein one of the plurality of electrodes may be substituted with a dynamic reference electrode.

7. The multielectrode sensor of claim 1, wherein one of the plurality of electrodes may be substituted with a thermodynamic reference electrode.

8. The multielectrode sensor of claim 1, wherein the potentiostat is a multichannel potentiostat.

9. The multielectrode sensor of claim 1, wherein the potentiostat is a single-channel potentiostat connected to a signal multiplexer.

\* \* \* \* \*